United States Patent [19]
Berson

[11] Patent Number: 5,932,870
[45] Date of Patent: Aug. 3, 1999

[54] DOCUMENTS CONTAINING A MAGNETIC STRIP WITH A BAR CODE AFFIXED THERETO

[75] Inventor: William Berson, Weston, Conn.

[73] Assignee: Pitney Bowes Inc., Stamford, Conn.

[21] Appl. No.: 08/610,793

[22] Filed: Mar. 11, 1996

[51] Int. Cl.[6] .................................................. G06K 19/06
[52] U.S. Cl. .................. 235/494; 235/462.01; 235/468; 235/491; 235/493
[58] Field of Search .................................. 235/493, 449, 235/494, 491, 462, 468, 462.04, 462.05, 462.01; 900/901, 902

[56] References Cited

U.S. PATENT DOCUMENTS

| | | | |
|---|---|---|---|
| 4,013,894 | 3/1977 | Foote et al. | 235/491 X |
| 4,423,415 | 12/1983 | Goldman | 235/382 X |
| 4,489,318 | 12/1984 | Goldman | 235/380 X |
| 4,546,352 | 10/1985 | Goldman | 235/487 X |
| 4,581,523 | 4/1986 | Okuno | 235/449 |
| 4,663,622 | 5/1987 | Goldman | 235/380 X |
| 4,785,290 | 11/1988 | Goldman | 235/380 X |
| 4,855,584 | 8/1989 | Tomiyama et al. | 235/493 |
| 4,876,441 | 10/1989 | Hara et al. | 235/488 |
| 4,983,817 | 1/1991 | Dolash et al. | 235/491 X |
| 4,995,081 | 2/1991 | Leighton et al. | 235/380 X |
| 5,025,399 | 6/1991 | Wendt et al. | 364/519 |
| 5,237,164 | 8/1993 | Takada | 235/494 X |
| 5,267,800 | 12/1993 | Petteruti et al. | 400/88 |
| 5,281,799 | 1/1994 | McIntire et al. | 235/380 |
| 5,334,823 | 8/1994 | Noblett et al. | 235/380 |
| 5,401,960 | 3/1995 | Fisun et al. | 235/468 X |
| 5,410,136 | 4/1995 | McIntire et al. | 235/380 |
| 5,420,924 | 5/1995 | Berson et al. | 380/23 |
| 5,514,860 | 5/1996 | Berson | 235/491 X |

*Primary Examiner*—Michael G. Lee
*Attorney, Agent, or Firm*—Ronald Reichman; Melvin J. Scolnick

[57] ABSTRACT

This invention relates to a document authentication system that may be read by a human and/or machine. A one or two-dimensional bar code or other printed code is printed over a magnetic strip, which may contain information linked to the encoded bar code data and human readable text that appears on the document. The magnetic strip that contains a printed bar code is affixed to a document that contains human readable text and a protective transparent laminates is placed over the bar code for abrasion resistance. The bar code or other code may be printed with an invisible ink for additional security.

17 Claims, 3 Drawing Sheets

DOCUMENTS CONTAINING A MAGNETIC STRIP WITH A BAR CODE AFFIXED THERETO

FIELD OF THE INVENTION

The invention relates generally to the field of detecting information that was printed on documents and more particularly to detecting bar codes that have been printed on magnetic strips which are affixed to documents.

BACKGROUND OF THE INVENTION

Bar codes have been used in a wide variety of applications as a source for information. Typically bar codes are used at a point-of-sale terminal in merchandising for pricing and inventory control. Bar codes are also used in controlling personnel access systems, mailing systems, and in manufacturing for work-in process and inventory control systems, etc. The bar codes themselves represent alphanumeric characters by series of adjacent stripes of various widths, i.e. the universal product code.

A bar code is a set of binary numbers. It consists of black bars and white spaces. A wide black bar space signifies a one and a thin black bar or space signifies a zero. The binary numbers stand for decimal numbers or letters. There are several different kinds of bar codes. In each one, a number, letter or other character is formed by a certain number or bars and spaces.

Bar code reading systems or scanners have been developed to read bar codes. The bar code may be read by having a light beam translated across the bar code and a portion of the light illuminating the bar code is reflected and collected by a scanner. The intensity of the reflected light is proportional to the reflectance of the area illuminated by the light beam. Thus, the scanners read the difference between the light and dark bars by reading the absences of reflected light. This light is converted into an electric current signal and then the signal is decoded.

Bar codes have been affixed to many different types of documents, so that they may be read by a machine, thereby reducing labor costs. Documents that include bar codes and/or indicia have been issued by governmental agencies, financial institutions, brokerage houses, etc., that authorize the holder of such documents to perform authorized tasks or grant rights to the holder of such a document. Examples of such documents are drivers licenses, entry access badges, identification cards, etc.

Information has been recorded on magnetic tape by magnetizing narrow lengthwise strips or tracks on the magnetic tape in a pattern corresponding to a sequence of binary states. Binary data is stored in one or more tracks across the width of the tape. A read head is usually associated with each track of magnetized material in order to read the information stored in the tracks.

Magnetic strips have been affixed to many different types of documents, so that they may be read by a machine, thereby reducing labor costs. Documents that include magnetic strips have been issued by governmental agencies, financial institutions, etc., that authorize the holder of such documents to perform authorized tasks or grant rights to the holder of such a document. Examples of such documents are drivers licenses, credit cards, automatic teller machine cards, etc.

In issuing government documents and other documents, it is desirable to have them of a convenient size, while including information necessary for identifying the holder with the rights conferred. With the above two requirements, documents issued by government agencies and others not only will have a defined format, but the textual information printed thereon is dense, thereby leaving little or no room for any additional information to be printed thereon.

Thus, a problem of the prior art is to issue documents of a convenient size that contains a large amount of information that may be read by a human and/or a machine.

Another problem of the prior art is to issue documents of a convenient size that contain a large amount of information and are difficult to alter or forge.

SUMMARY OF THE INVENTION

This invention overcomes the disadvantages of the prior art by providing a document: of a convenient size; that contains a large amount of information; that may be read by a human and/or machine; and that is difficult to alter or forge. The foregoing disadvantages may be overcome by: printing a one or two-dimensional bar code or other printed code over a magnetic stripe, which may contain information linked to the encoded bar code data and human readable text; affixing the magnetic strip that contains a printed bar code to a document that contains human readable text; and placing protective transparent laminates over the bar code for abrasion resistance. The bar code or other code may be printed with an invisible ink for additional security.

DETAILED DESCRIPTION OF THE PREFERRED EMBODIMENT

Figure 1:
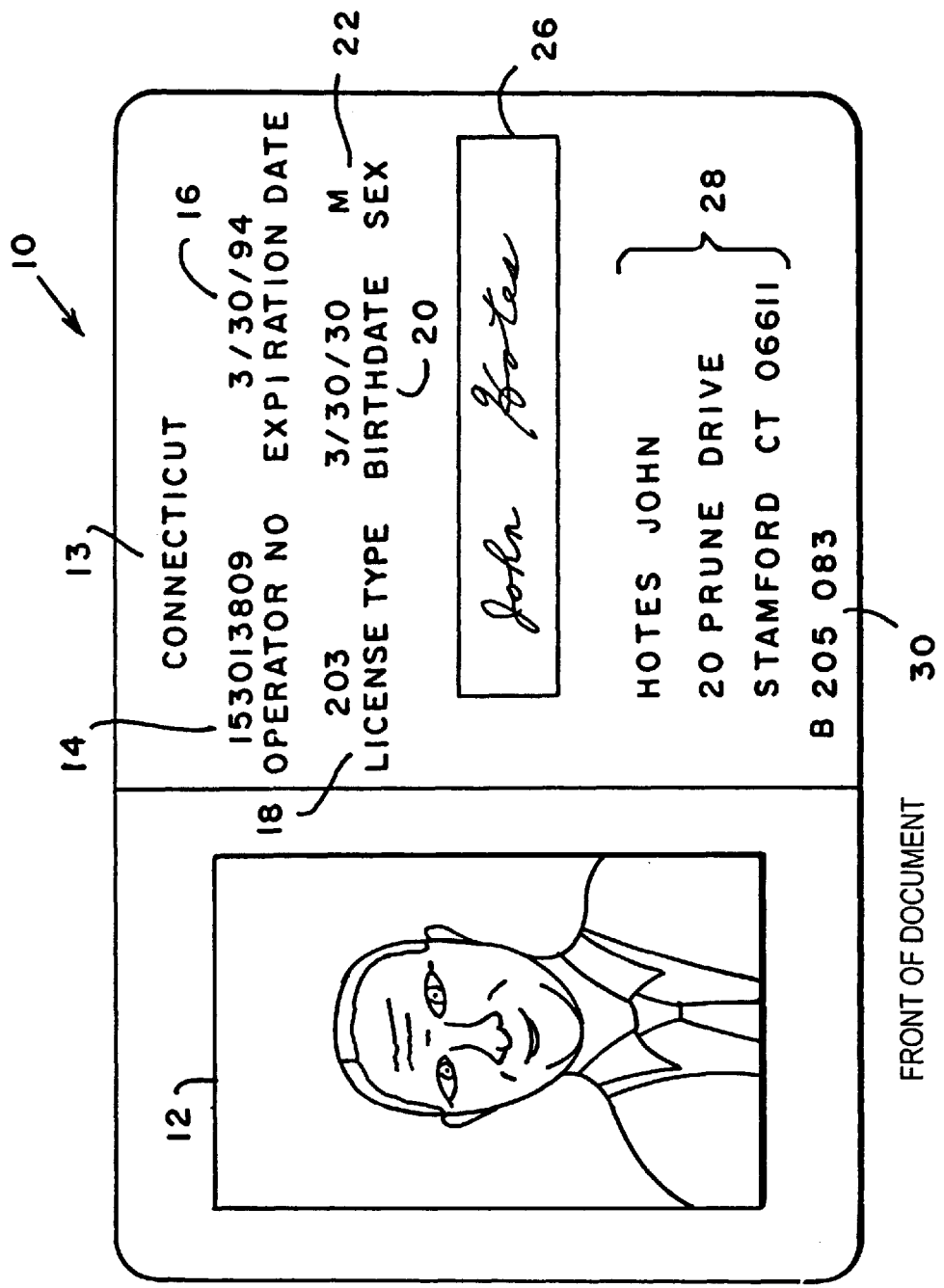
FIG. 1 is a drawing of a plan view of the front of a drivers license.

Referring now to the drawings in detail and more particularly to FIG. 1, the reference character 10 represents a document in the form of a drivers license. A photograph 11 of the person to whom the license was issued appears on the front side of document 10. The document 10 can be made of a single layer, or sheet, or a plurality of layers that are laminated together. A document composed of a single layer or multiple layers in this specification, including the claims, will be referred to collectively as a sheet. Drivers license 10 also contains other data, such as the state in which the license has been issued 13, the operator number 14, the expiration date 16, the license type 18, the birth date of the recipient 20, the gender 22 of the recipient, the signature of the recipient 26, the name and address of the recipient 28 and issuer's identification data 30. It will be noted that driver's license 10 has a dense data field for the items that were just referenced. As such, it would be difficult to place additional information on the face thereof, as it is necessary that the document 10 be of a convenient size. As a consequence, it is within the contemplation of this invention to provide additional information in a compact form on the back side of document 10.

Figure 2:
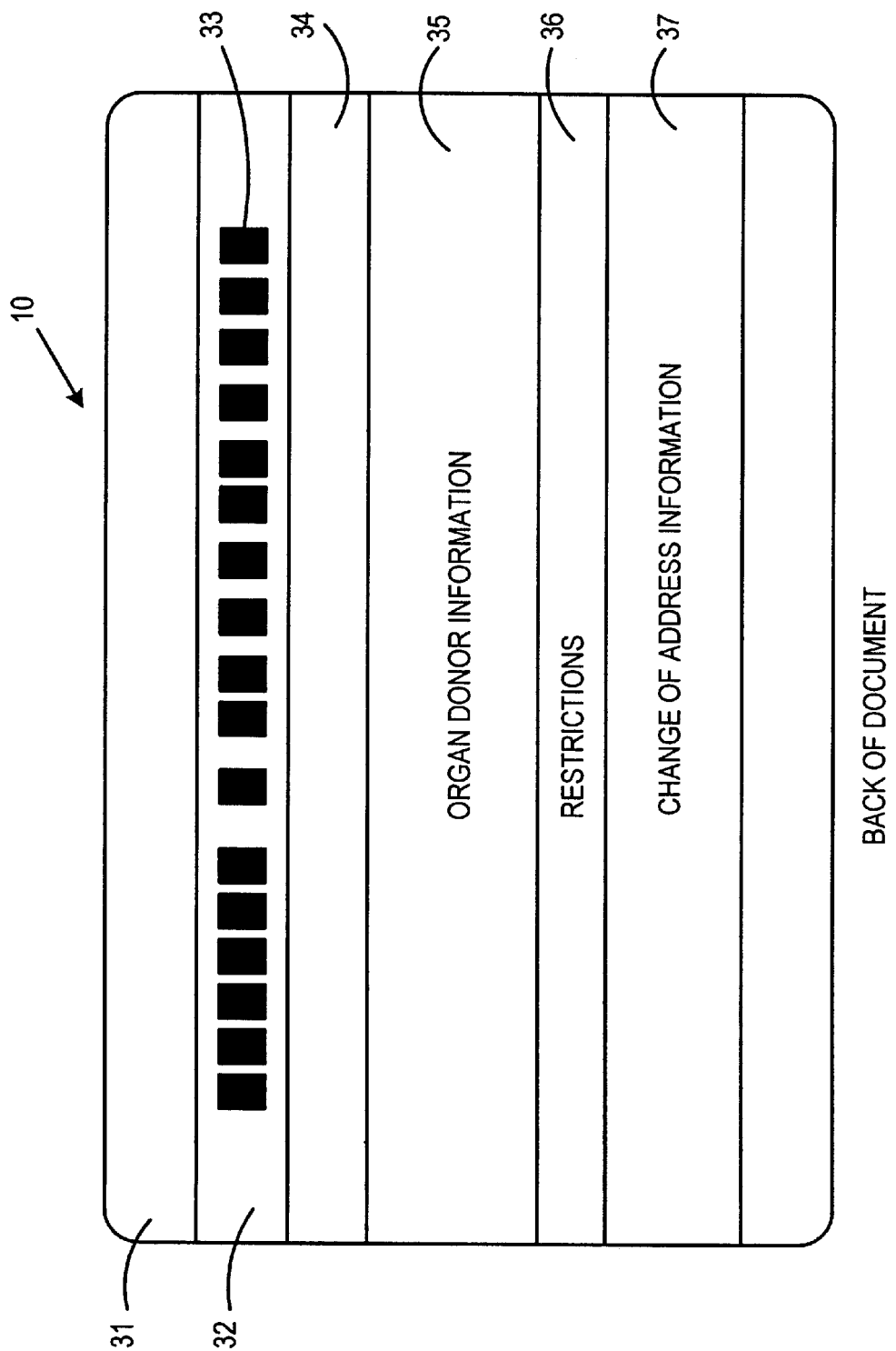
FIG. 2 is a drawing of a plan view of the back of a drivers license.

FIG. 2 is a drawing of a plan view of the back side of drivers license 10. A magnetic strip 32 is applied to the outer surface of the back of document 10. Strip 32 comprises: a carrier layer of acetate, mylar or other material with a coating of ferric oxide, rare-earth ferrite or other magnetic materials together with binders, disperants and lubricants. It will be obvious to one skilled in the art that magnetic strip 32 may have one or more tracks that store information. Adjacent to strip 32 are open areas 31 and 34. Areas 31 and 34 contain no additional information. In essence areas 31 and 34 are the back of document 10 with nothing affixed thereto. Areas 31 and 34 are "white areas" preferably left blank to help a reading mechanism 60 read strip 32.

A bar code 33 or other code is printed on the backing layer of magnetic strip 32. While a 1D bar code is shown it will be obvious to one skilled in the art that a 2D bar code may be utilized. The carrier layer of strip 32 is opaque white if code 33 is printed with a contrasting visible ink containing a pigment such as carbon black.

In the event code 33 is printed with a color other than black, carrier layer of strip 32 will be a contrasting color of the ink used to print code 33 in order that code 33 will be easily read. Strip 32 is then covered with a thin transparent laminate overlay 44 to provide resistance to abrasion of the code 33. Overlay 44 is described in the description of FIG. 3. It is within the contemplation of this invention to have the information that is encoded in strip 32 and bar code 33 have a correspondence to the human readable information printed on document 10 in order to authenticate document 10. Other human readable information, which may be mandated by statute is printed on the back of document 10. Organ donor information is printed in area 35 and restrictions of the license granted is printed in area 36. Change of address information is printed in area 37.

Figure 3:
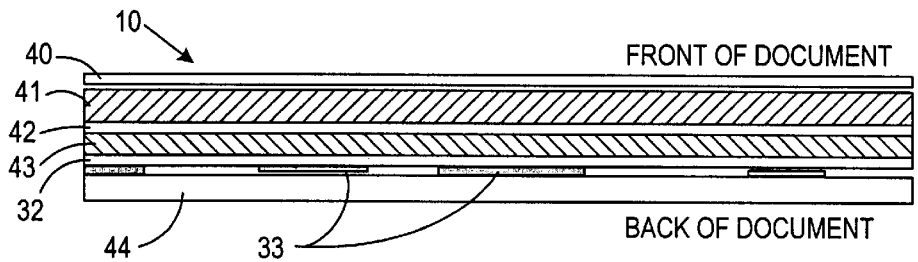
FIG. 3 is a drawing of a side view of a drivers license.

FIG. 3 is a drawing of a side view of document 10. The front of document 10 is shown in the upper part of FIG. 3 and the bottom of document 10 is shown in the lower part of FIG. 3. A security laminate 40, that prevents alterations to the front of document 10 is placed over the front of document 10. The front of document 10 may be a card 41 which has the information and photograph shown in FIG. 1 affixed thereto. The information contained on card 41 may be produced by a color copier or any other device for affixing information to a card. An optional adhesive layer 42 is used to bond card 41 to card 43. The back of document 10 may be a card 43 which has the human readable information shown in FIG. 2 printed thereon. The information contained on card 43 may be produced by a laser printer or any other method of affixing information to card 43. Card 43 may be a separate card, or the reverse side of card 41. A magnetic strip 32 is applied to the outer surface of card 43. Strip 32 comprises: a carrier layer of acetate, mylar or other material with a coating of ferric oxide, rare-earth ferrite or other magnetic materials together with binders, disperants and lubricants. The carrier layer (layer close to card 43) of strip 32 is opaque white if code 33 is printed with black ink. In the event code 33 is printed with a color other than black, carrier layer of strip 32 will be a contrasting color of the ink used to print code 33 in order that code 33 will be easily read. Strip 32 is then covered with a thin transparent laminate overlay 44 to provide resistance to abrasion of the code 33.

Figure 4:
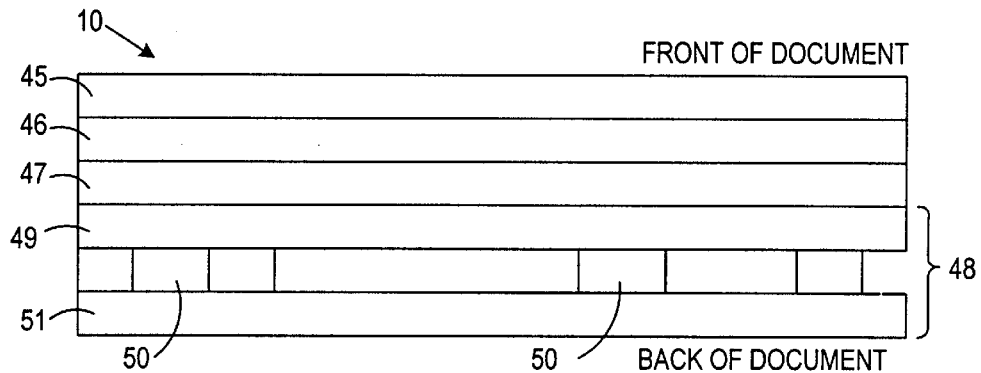
FIG. 4 is a drawing of a side view of an alternate embodiment of a drivers license.

FIG. 4 is a drawing of a side view of an alternate embodiment of document 10. The front of document 10 is shown in the upper part of FIG. 4 and the bottom of document 10 is shown in the lower part of FIG. 4. A security laminate 45, that prevents alterations to the front of document 10 is placed over the front of document 10. The front of document 10 may be a card 46 which has the information and photograph shown in FIG. 1 affixed thereto. The information contained on card 46 may be produced by a color copier or any other device for affixing information to a card. The back of document 10 may be a card 47 which has the human readable information shown in FIG. 2 printed thereon. The information contained on card 47 may be produced by a laser printer or any other method of affixing information to a card. A label 48 that includes: a strip 49 containing a carrier layer of acetate, mylar or other material with a coating of ferric oxide, rare-earth ferrite or other magnetic materials together with binders, disperants and lubricants; a bar code or other code 50 is printed on strip 49; and a transparent overlay 51 is affixed to card 47. The carrier layer (layer close to card 47) of strip 49 is opaque white if code 50 is printed with black ink. In the event code 50 is printed with a color other than black, carrier layer of strip 49 will be a contrasting color of the ink used to print code 50 in order that code 50 will be easily read.

The bar code or code that was printed on magnetic strip 32 or 49 may be printed with an invisible phosphorescent ink or invisible fluorescent ink. An example of a phosphorescent ink is an ink containing 5% YPV-Ytterium phosphovanadate Europium Doped Y (P,V) $0_4$ or 5% Ytterium OxySulfide Europeium doped $Y_2O_2$ S:Eu in water.

Figure 5:
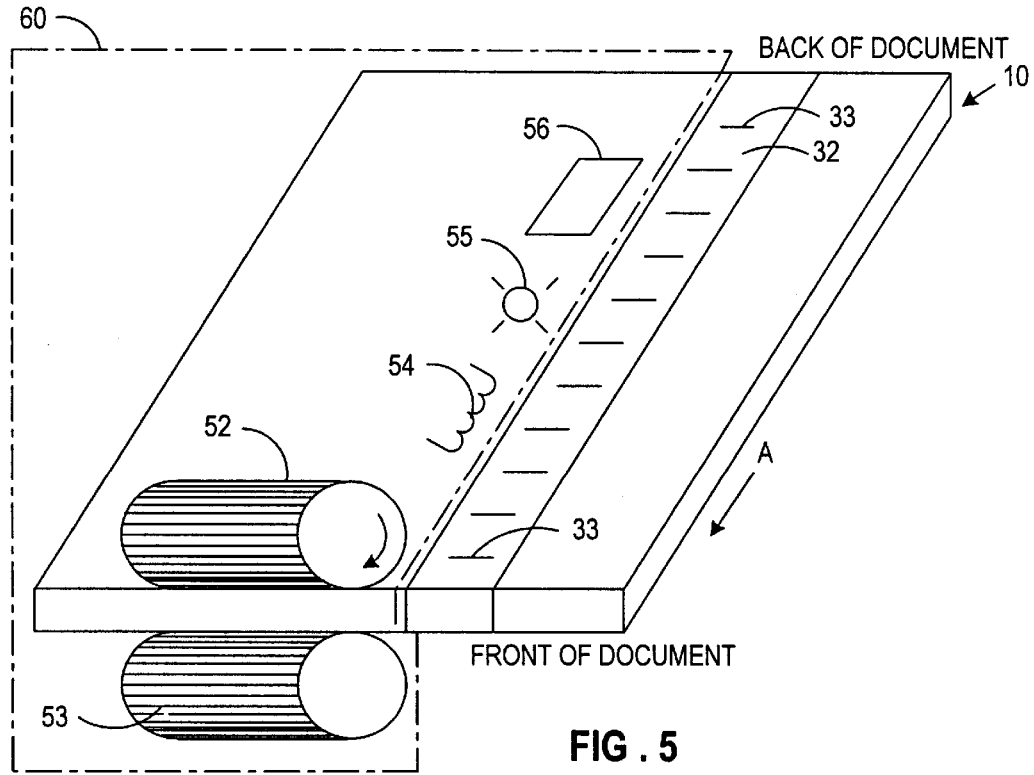
FIG. 5 is a drawing of reading mechanism that may be used to read the bar code and magnetic strip.

FIG. 5 is a drawing of reading mechanism 60 that may be used to read bar code 33 and magnetic strip 32. Reading mechanism 60 comprises: drive roller 52; idler roller 53; magnetic read head 54; light source 55; and detector 56. Document 10 is placed between a drive roller 52 and a idler roller 53. The back of document 10 will be engaged by drive roller 52 and the front of document will be engaged by idler roller 53. When drive roller 52 and idler roller 53 rotates document 10 will be driven in the direction shown by Arrow A. Document 10 will be driven past magnetic read head 54 at a speed that will enable magnetic read head 54 to read the magnetic information encoded in strip 32 and detector 56 to read code 33 which has been illuminated by illumination source 55. Magnetic read head 54 may be the ASM Read Head #21052071 manufactured by Magtech America of 20710 Manhattan Place, Suite 112, Torrance, Calif. 90501. The gap between strip 32 and magnetic read head 54 must be minimized for good signal levels. Gaps of 0.003" or less are desirable. Source 55 may be a lamp, light emitting diode, laser, or xenon flash lamp, etc. Detector 56 may be a charged coupled device, phototransistor array or photomutlipier, etc. Detector 56 may be the TC211 detector manufactured by Texas Instruments.

The above specification describes a new and improved document authentication system. It is realized that the above description may indicate to those skilled in the art additional ways in which the principles of this invention may be used without departing from the spirit. It is, therefore, intended that this invention be limited only by the scope of the appended claims.

What is claimed is:

1. A document having provision for determining authentication thereof, comprising:

a) a sheet having human visual text printed thereon;

b) a magnetic material having information encoded thereon that is attached to said sheet;

c) a code containing information that is printed on said magnetic material with an invisible ink that may be seen only with light having certain specified wavelengths in which the ink may be viewed so that the code on the magnetic material will be hidden for security purposes; and wherein the information coded on said magnetic material is different from the magnetic information encoded in said magnetic material to embed authentication of the document in a manner not visible to the unaided human eye.

2. The document of claim 1, wherein the printed text printed upon said document has correspondence to at least a portion of the information encoded on said magnetic material.

3. The document of claim 1, wherein the printed text printed upon said document has correspondence to at least a portion of the information encoded on said magnetic material and the information contained in said code.

4. The document of claim 1, wherein the information encoded on said magnetic material is different from the visual text information printed on said sheet to embed authentication of the document in a manner not visible to the unaided human eye.

5. The document of claim 1, wherein the information coded on said magnetic material and encoded in said magnetic material is different from the textual information printed on said sheet to embed authentication of the document in a manner not visible to the unaided human eye.

6. The document of claim 1, wherein the document is of a type issued by a Government agency.

7. The document of claim 6, wherein the document is a driver's license.

8. The document of claim 1, wherein the document is of a type issued by a business entity.

9. The document of claim 1, wherein said code is a bar code.

10. The document of claim 1, wherein said magnetic material is in the form of a strip.

11. The document of claim 1, wherein said magnetic material is in the form of a label that is attached to said sheet.

12. The document of claim 1, further including covering said document with one or more protective layers of transparent material.

13. The document of claim 1, wherein the invisible ink is a phosphorescent ink.

14. The document of claim 1, wherein the invisible ink is a fluorescent ink.

15. A method for determining if a document having a code printed on a encoded magnetic material that is affixed to a document that contains human readable text printed thereon is authentic, comprising the steps of:

a) scanning a document to derive data thereof to encode at least a portion of the scanned information on a magnetic material;

b) scanning a document to derive data thereof to create a code;

c) printing at least a portion of the code derived in step b) with an invisible ink that may be seen only with light having certain specified wavelengths in which the ink may be viewed on the encoded material of step a);

d) reading the information encoded on the magnetic material;

e) reading the code printed on the magnetic material;

f) comparing the text printed on the document with the information encoded on the magnetic material and the information contained in the code; and wherein the information coded on said magnetic material is different from the magnetic information encoded in said magnetic material to embed authentication of the document in a manner not visible to the unaided human eye.

16. The method of claim 15, wherein the code in step b is a bar code.

17. The method of claim 15, wherein the magnetic material of step a is contained on a label that is affixed to the document.

* * * * *